Oct. 9, 1928.

W. M. BRADSHAW 1,686,727

ELECTRICAL MEASURING INSTRUMENT

Filed Aug. 20, 1924

WITNESSES:
G. S. Neilson
E. R. Evans

INVENTOR
William M. Bradshaw
BY
Wesley G. Carr
ATTORNEY

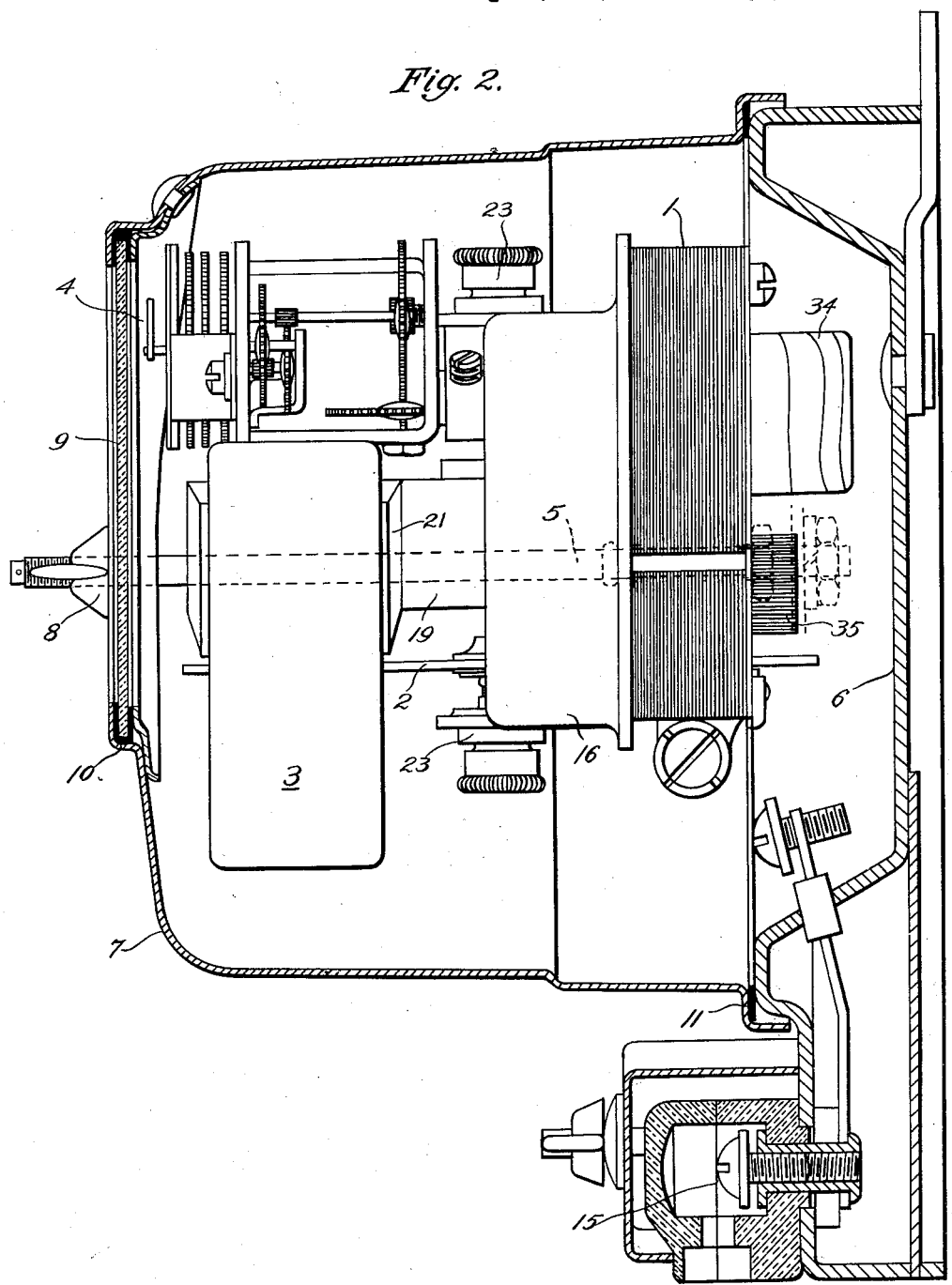

Oct. 9, 1928.
W. M. BRADSHAW
1,686,727
ELECTRICAL MEASURING INSTRUMENT
Filed Aug. 20, 1924   4 Sheets-Sheet 3
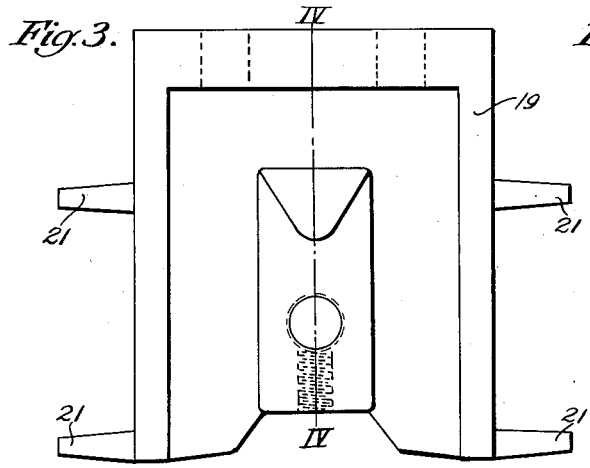
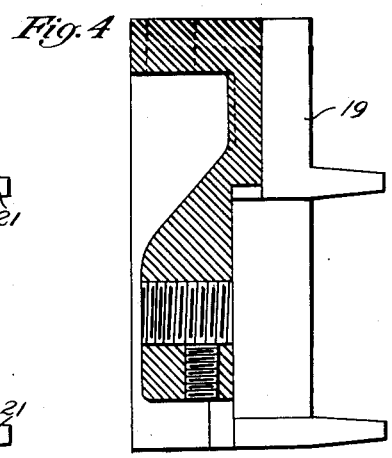
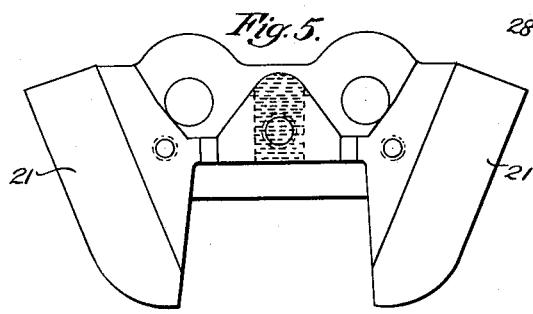
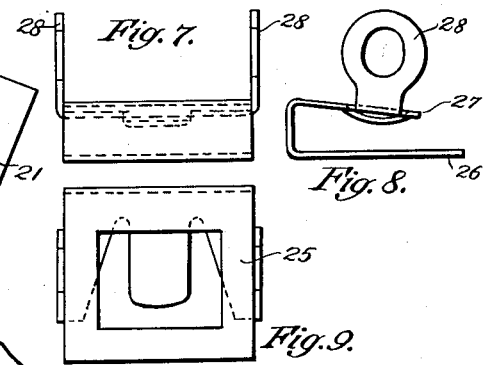
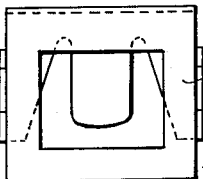
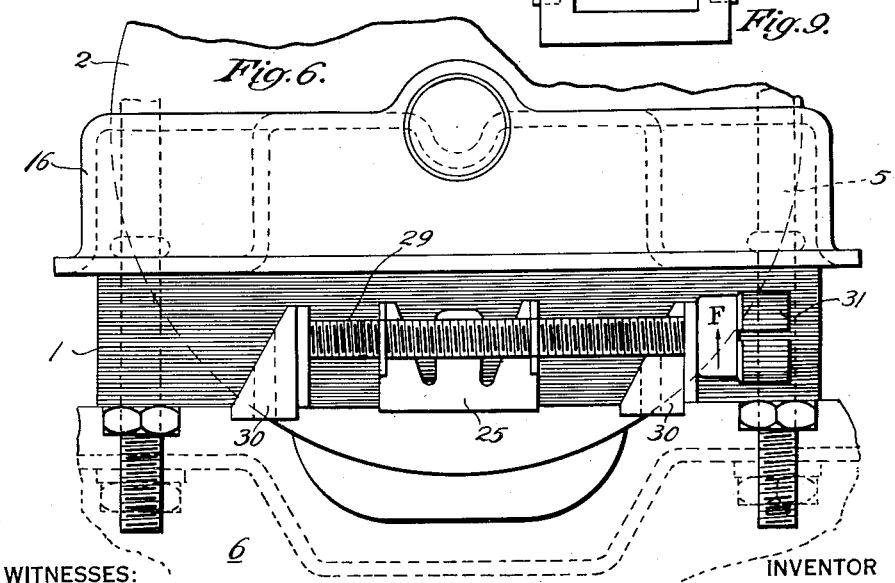
WITNESSES:
G. S. Neilson
E. R. Evans
INVENTOR
William M. Bradshaw
BY
Wesley G. Carr
ATTORNEY

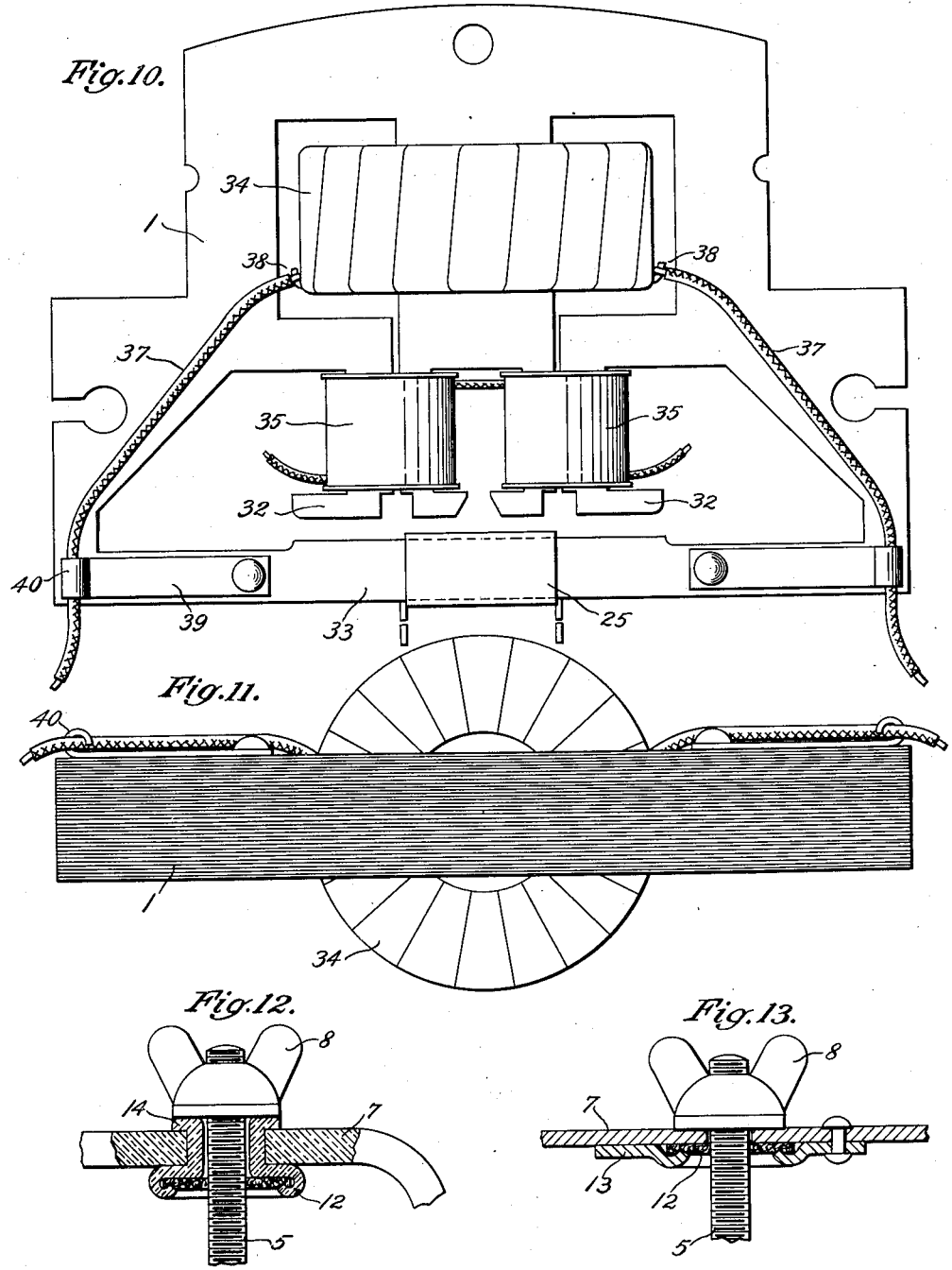

Patented Oct. 9, 1928.

1,686,727

UNITED STATES PATENT OFFICE.

WILLIAM M. BRADSHAW, OF WILKINSBURG, PENNSYLVANIA, ASSIGNOR TO WESTING-HOUSE ELECTRIC & MANUFACTURING COMPANY, A CORPORATION OF PENNSYLVANIA.

ELECTRICAL MEASURING INSTRUMENT.

Application filed August 20, 1924. Serial No. 733,039.

My invention relates to electrical measuring instruments and particularly to watthour meters of the induction type although certain features thereof are of general application.

In general, the object of my invention is to improve and simplify the construction of instruments of this character.

Another object of my invention is to provide a meter of the integrating or motor type that shall have a permanent magnet with an adjustable shunt, the magnet and the shunt both being supported upon a detachable bracket, thereby permitting the instrument to be partially disassembled without altering the adjustment.

Another object of my invention is to provide a watthour meter or similar instrument that shall have improved means for compensating for the friction of the rotating elements at light load.

Another object of my invention is to provide improved means for protecting the windings of an instrument against excessive voltages.

Another object of my invention is to provide an instrument, of the above described character, that shall have a dust-proof casing including a removable cover that is adapted to be secured to the frame of the instrument by studs projecting through holes in the cover.

In the accompanying drawings, I have illustrated a preferred embodiment of the invention, in which Figure 1 is a front elevational view of a single-phase watthour meter of the induction type with the cover removed;

Fig. 2 is a side view, partially in section and partially in elevation, of the meter shown in Fig. 1;

Figs. 3, 4 and 5, are detail views of the bracket for supporting the permanent magnets of the meter shown in Fig 1;

Fig. 6 is a fragmentary view of the light load or friction-compensating element mounted upon the core member of the meter embodying my invention;

Figure 1:
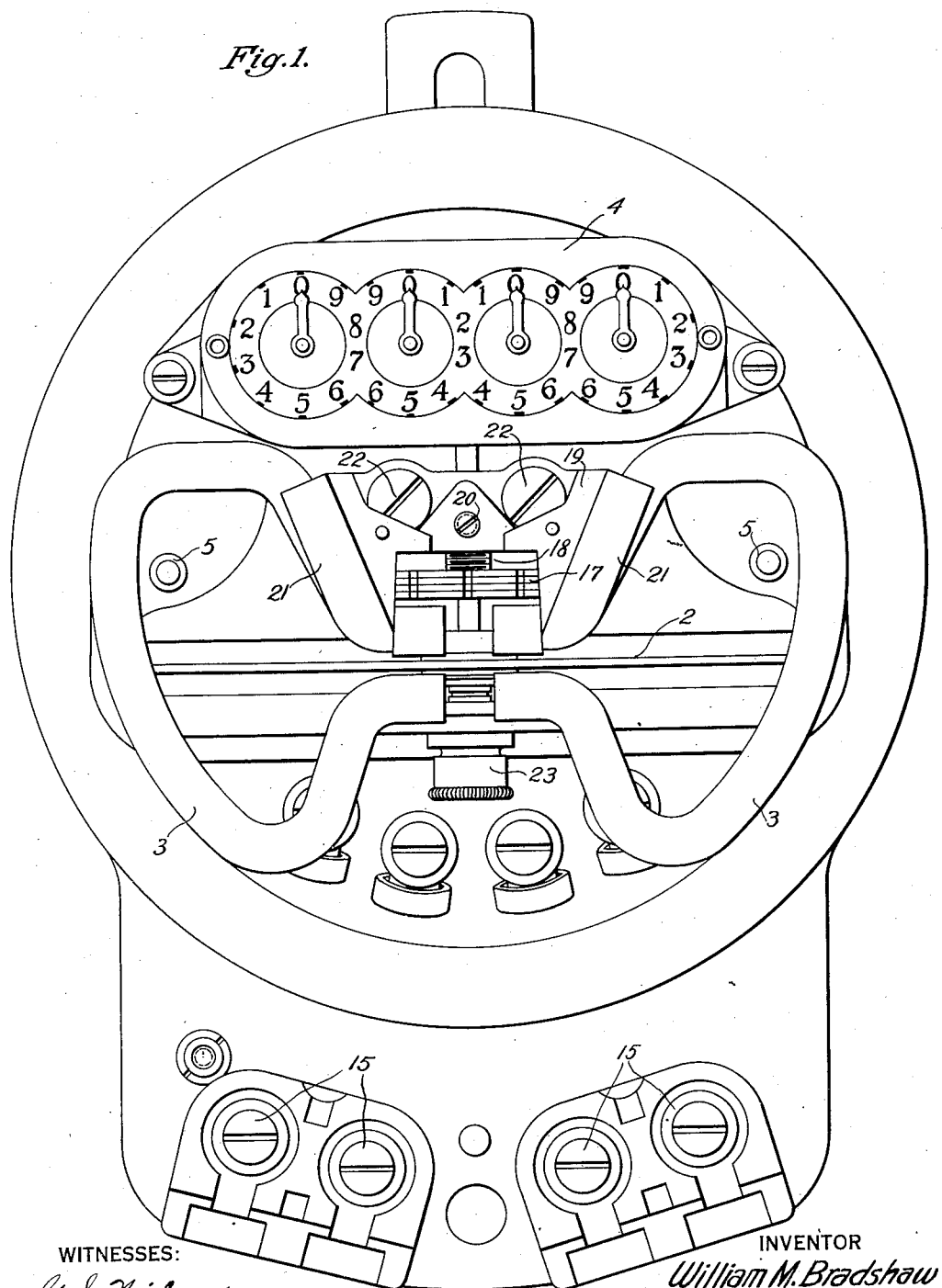

Figs. 7, 8, and 9 are detail views of the friction-compensating element shown in Fig. 6;

Figs. 10 and 11 are front and top views, respectively, of the core member and energizing windings; and Figs. 12 and 13 are detail views of the dust-proof securing studs for fastening the cover to the base.

The single-phase, induction watthour meter shown in the drawings comprises a magnetizable core member 1, a rotatable disc armature 2 cooperating with said core member, permanent magnets 3 adjacent to the disc 2 to effect a counter-torque thereon and a register 4 for recording the number of rotations of the disc 2. The meter elements are secured by two studs 5 to a base 6, and an enclosing cover 7 is secured to the base 6 by wing nuts 8 upon the cover studs 5. The cover 7 is provided with a transparent window 9 in front of the register 4, so that the registration of the meter may be observed.

The casing of the meter is rendered dust-proof by the interposition of gaskets 10 and 11 between the window, the cover and the base and by the use of felt washers 12 (see Fig. 13) engaging the cover studs 5. The washer 12 is clamped between the cover 7 and a plate 13 that is riveted to said cover.

In the case of instruments having a glass cover, the washer 12 may be carried by a suitable sleeve 14 inserted in the hole in the cover as shown in Fig. 12. By the use of a washer secured to the cover itself, the inconvenience and annoyance of providing and adjusting separate washers is avoided. When separate washers are used, these washers are often lost or discarded when the cover is removed, and the cover is replaced without any washers and hence without any dust protection.

The core member 1 is energized in the usual manner by series and shunt windings 34 and 35 connected to the terminals 15. It will be understood that the core member 1 is so energized in accordance with the power transmitted by an associated circuit that the disc 2 rotates exactly in proportion to the load consumed in said circuit.

In order to insure that the rate of rotation of the disc 2 shall be exactly proportional to the energy consumed in the circuit over a wide range of load, I have provided means for adjusting the retarding flux produced by the permanent magnets 3 intercepting the disc 2. The permanent magnets 3 are shielded from the electromagnet 1 by an iron shield 16 and, therefore, the magnetic flux produced by said permanent magnets is constant regardless of the energization of said electromagnet. However, an adjustable shunt member 17 of iron (see Fig. 1) serves to shunt some of the flux away from the disc 2. The shunt member 17 is provided with a threaded shank 18 engaging a threaded portion of a bracket 19. As the shunt member is turned, it is raised or lowered depending upon the direction of rotation. The change in position with reference to the ends of the permanent magnets 3 causes the flux threading the disc 2 to be altered. Accordingly, the retardation of the disc 2 is changed, thereby changing the registration of the meter for a given load. A set screw 20 is provided for locking the adjustment of the shunt member 17.

The bracket 19 carries both the permanent magnets 3 and the shunt 17. As shown in Figs. 3 to 5, the bracket 19 is provided with integral projecting lugs 21 adapted to engage the permanent magnets 3. In assembling the meter, the magnets 3 and the bracket 19 are placed in a mounting jig and the lugs 21 are swaged over the edges of the magnets, thereby permanently securing the magnets and bracket together in a fixed relation.

The bracket 19 is removably secured to the shield 16 by two screws 22. In order to gain access to the bearings 23 of the disc 2, the screws 22 are loosened and the permanent magnets 3 and the bracket 19 removed as a unit. Since the shunt member 17 is also carried upon the bracket 19, the magnets may be taken off and replaced without altering the adjustment of the meter, as it is not necessary to change the fixed relation of the various elements during such an operation.

In order to compensate for the friction of the rotating disc 2 and the register 4, I provide an adjustable metallic compensating member 25 that is mounted on the core member 1, as shown in Fig. 6. The adjustable compensating member 25 comprises two opposite sides 26 and 27. The side 26 is so perforated, as shown in Fig. 9, as to provide a single turn or a short-circuited winding for modifying the flux in the core member 1. The side 27 is provided with two perforated lugs 28 adapted to cooperate with a threaded adjusting screw 29. The screw 29 is rotatably mounted in two brackets 30 that are secured to the core member 1 and has a slotted head 31. Upon adjusting the screw 29 by means of a screw driver or similar tool, the compensating member 25 is moved transversely along the core member 1.

As shown in Figs. 6 and 10, the perforated side 26 of the compensating member 25 is located between the salient poles 32 and the connecting portion or yoke 33 of the core member 1. The perforated portion 26 forms in effect a short-circuited winding in the air-gap of the core member, and, therefore, produces an unbalancing of the flux between the pole pieces 32 and the yoke 33. At light load, the shunt winding 34 is fully energized and the series winding 35 is practically deenergized. However, the compensating device 25 produces such an unbalancing of the flux from the winding 34 through the two poles 32 that a slight torque is exerted on the disc 2 to compensate for the frictional torque of said disc and register. By turning the adjusting screw 29, the position of the member 25 is varied, thereby permitting accurate compensation for the friction of the meter.

It has been found that in instruments of this kind, in the case of lightning discharges or other excessive voltages upon the circuit to which they are connected, the shunt coil which comprises a large number of turns of fine wire, is often burnt out or damaged. In order to prevent this occurrence, I provide the shunt winding 34 with leads 37 (Fig. 10) preferably of flexible wire covered with treated cotton sleeving, soldered to terminals 38 of the winding. Small metal clips 39 are riveted to the core member 1 and are clamped around the lead 37 as shown at 40. In the event that the meter is subjected to an excessive voltage that would be likely to burn out the shunt coil, the insulation between the lead 37 and the clip 39 is punctured and no damage is done to the coil 34. The lead 37 may be burned off at the clip 39, but to repair the instrument it is only necessary to solder another lead to the terminal 38.

While my invention is particularly applicable to a watthour meter of the induction type and I have so shown and described it, it is evident that it may be applied to other instruments without material alterations and accordingly I desire that my invention shall not be limited in scope except by such restrictions as may be imposed by the prior art.

I claim as my invention:

1. An electrical measuring instrument comprising a magnetizable core member, means for energizing said core member, a pivoted armature adjacent to said core member and actuated by the magnetic flux traversing the same and means for adjusting the torque exerted by the flux traversing said core member on said armature, said means including a longitudinally reciprocable movable conducting member mounted on said core member.

2. An electrical measuring instrument comprising a magnetizable core member having salient poles, a pivoted armature adjacent to said poles, and friction-compensating means comprising a short-circuited turn supported by said core member for transverse adjustment across the faces of said poles.

3. A meter comprising a magnetizable core member having salient poles and an integral yoke opposite said poles, a pivoted conducting member adjacent said poles, means including said core member for producing magnetic flux to rotate said conducting member, and friction-compensating means for said rotating member, said compensating means comprising a short-circuited turn mounted on said yoke and means for adjusting the relation thereof to said poles.

4. A meter comprising an armature, a plurality of permanent magnets adjacent said armature, a bracket supporting said magnets, and a single adjustable shunt-member for said magnets, said shunt-member being solely supported by a screw mounted on said bracket.

5. A meter comprising a frame, a rotatable member pivoted in said frame, a detachable bracket mounted on said frame, a plurality of permanent magnets supported by said bracket and cooperating with said rotatable member, and an adjustable shunt for said magnets mounted on said bracket, said shunt comprising a plurality of discs of magnetizable material.

6. A meter comprising a winding, an insulated lead therefor, and a metal clip for said lead and arranged to provide a breakdown point when an excessive voltage is applied to said winding, the insulation of said lead being weaker than that of the turns of said winding.

7. A meter comprising an armature, a plurality of permanent magnets adjacent said armature, a bracket supporting said magnets, and a single shunt-member for said magnets, said shunt member being solely supported by a screw mounted on said bracket.

In testimony whereof, I have hereunto subscribed my name this 16th day of August, 1924.

WILLIAM M. BRADSHAW.